United States Patent
Quick

(10) Patent No.: US 8,725,355 B2
(45) Date of Patent: May 13, 2014

(54) SELF-BALANCING VEHICLE WITH SWIVEL SEAT STEERING

(71) Applicant: Bradley Scott Quick, Staatsburg, NY (US)

(72) Inventor: Bradley Scott Quick, Staatsburg, NY (US)

( * ) Notice: Subject to any disclaimer, the term of this patent is extended or adjusted under 35 U.S.C. 154(b) by 0 days.

(21) Appl. No.: 13/795,855

(22) Filed: Mar. 12, 2013

(65) Prior Publication Data

US 2014/0020962 A1    Jan. 23, 2014

Related U.S. Application Data

(63) Continuation-in-part of application No. 13/554,033, filed on Jul. 20, 2012, now abandoned.

(51) Int. Cl.
*B62D 1/00*    (2006.01)

(52) U.S. Cl.
USPC ............................... 701/41; 180/22; 180/316

(58) Field of Classification Search
USPC ............... 701/36, 41, 49; 180/6.2, 6.24, 6.28, 180/6.44, 7.1, 221, 218, 316, 400, 410, 180/444; 280/208, 266, 282
See application file for complete search history.

(56) References Cited

U.S. PATENT DOCUMENTS

| 3,669,468 | A | * | 6/1972 | Rich | 280/267 |
| 3,700,058 | A | * | 10/1972 | Kuwahara | 180/21 |
| 3,920,093 | A | * | 11/1975 | Moran et al. | 180/21 |
| 4,664,208 | A | * | 5/1987 | Horiuchi et al. | 180/23 |
| 5,971,091 | A | | 10/1999 | Kamen et al. | |
| 6,079,690 | A | * | 6/2000 | Yoon | 248/622 |
| 6,581,714 | B1 | | 6/2003 | Kamen et al. | |
| 6,702,303 | B1 | * | 3/2004 | Kolsum | 280/11.19 |
| 6,988,741 | B2 | * | 1/2006 | Borochov et al. | 280/282 |
| 7,464,951 | B2 | * | 12/2008 | Coray | 280/282 |
| 8,099,200 | B2 | * | 1/2012 | Coombs | 701/4 |
| 2003/0127272 | A1 | * | 7/2003 | Baker et al. | 180/326 |
| 2003/0230869 | A1 | * | 12/2003 | Beresnitzky et al. | 280/282 |
| 2004/0090039 | A1 | * | 5/2004 | Borochov et al. | 280/282 |
| 2005/0269793 | A1 | * | 12/2005 | Mackin et al. | 280/87.041 |
| 2005/0285381 | A1 | * | 12/2005 | Coray | 280/771 |
| 2009/0178876 | A1 | * | 7/2009 | Miki et al. | 180/411 |
| 2010/0250040 | A1 | | 9/2010 | Yamano | |
| 2011/0022272 | A1 | * | 1/2011 | Hung et al. | 701/42 |
| 2011/0204592 | A1 | * | 8/2011 | Johansen et al. | 280/304.1 |
| 2013/0228385 | A1 | * | 9/2013 | Chen | 180/6.5 |

OTHER PUBLICATIONS

The Daily Mail, "Hold on tight! The world's first unicycle MOTOR-BIKE", Apr. 29, 2008, Associated Newspapers, Ltd http://www.dailymail.co.uk/news/article-562726/Hold-tight-The-worlds-unicycle-MOTORBIKE.html?printingPage=true.*

* cited by examiner

*Primary Examiner* — Mary Cheung
*Assistant Examiner* — Rodney Butler
(74) *Attorney, Agent, or Firm* — Laubscher & Laubscher, PC

(57) ABSTRACT

A motorized vehicle includes a pair of opposed wheels and a seat which is mounted so that it can rotate about a vertical axis. The rotational position of the seat is sensed by at least one sensor, such as a potentiometer or rotary encoder, which produces an output signal. This signal is input into a control system which rotates the wheels to steer the vehicle based on the rotational position of the seat.

10 Claims, 5 Drawing Sheets

SELF-BALANCING VEHICLE WITH SWIVEL SEAT STEERING

This application is a continuation in part of U.S. application Ser. No. 13/554,033 filed Jul. 20, 2012. The entire content of this application is incorporated herein by reference.

FIELD OF THE INVENTION

The present invention pertains to a self-balancing vehicle or scooter that is steered by a human operator swiveling the seat.

BACKGROUND OF THE INVENTION

Two wheeled self-balancing vehicles generally have two coaxial wheels spaced a distance apart. Each wheel is controlled by a separate electric motor. The control systems for these vehicles receive inputs from gyroscopes and accelerometers to determine the pitch angle of the vehicle and generate appropriate outputs to the wheel driving motors to dynamically stabilize the vehicle. U.S. Pat. No. 5,971,091 describes such a system. To turn the vehicle, the control system biases the outputs to the two motors such that one motor turns faster than the other.

The majority of self-balancing vehicles require the operator to be in a standing position, usually with a handlebar positioned in front of the operator that the operator uses to steer the vehicle. With these vehicles, forward and backward motion is initiated by the operator pushing forward.

Some earlier self-balancing vehicles were steered by twisting a grip on the handlebar. U.S. Pat. No. 6,581,714 describes this method. Some later versions are steered by leaning the entire handlebar assembly to the left or right. US patent application publication No. 2010/0250040 describes a method of steering a self-balancing vehicle where the operator uses his legs to push a vertical steering mechanism from side to side.

While the prior devices normally operate satisfactorily, they do not afford the user the ability to operate the vehicle from a seated position.

SUMMARY OF THE INVENTION

The present invention is a self-balancing two wheeled vehicle that transports a single human operator over the ground while automatically maintaining its balance. In the invention, the operator is supported by a seat. The seat pivots about a vertical shaft that is in substantially the center of the vehicle. The operator's feet are positioned on top of two fenders, each of which covers the top of one of the vehicle's two wheels. The operator controls the forward and backward operation of the vehicle by shifting his weight to create a moment on the vehicle in the pitch direction. This moment can be transferred to the vehicle either by the operator shifting his weight to the front or back of the seat or by applying a force forward or backward with his feet relative to the seat. The operator steers the vehicle by using the pressure of his feet on the fenders to swivel the seat and the rest of his body with respect to the frame of the vehicle.

The vehicle's control system monitors how far the seat is swiveled from its neutral position. It then biases the output to the two wheels by an amount substantially proportional to the seat swivel angle. This bias causes the body of the vehicle to continue to rotate until the body re-aligns with the seat.

This method of steering provides an extremely intuitive method of steering for the human operator. He uses his feet to turn his body in the direction he would like to travel and the vehicle automatically points in the direction that his body is facing. This is true whether he is traveling forward, backward, or stationary.

The operator's body position provides a number of advantages. First the seated position is more comfortable for the operator, especially when operating the vehicle for long periods of time. Second, since the wheels are under the operator's feet rather than beyond the operator's feet, the vehicle is much narrower than many self-balancing scooters. The vehicle is no wider than the operator himself which makes it much easier to use indoors or on crowded sidewalks. Third, the operator can easily dismount the vehicle, either forward or backward, and land on his feet in the case where the vehicle fails to balance for whatever reason. He can also quickly move his foot to the side without tripping over a wheel.

The invention allows the operator to control the vehicle without requiring input from his hands. This frees his hands for other functions such as holding objects, performing tasks, and social interaction.

BRIEF DESCRIPTION OF THE FIGURES

Other objects and advantages of the invention will become apparent from a study of the following specification when viewed in the light of the accompanying drawing, in which.

DETAILED DESCRIPTION

The invention is a two wheeled self-balancing vehicle. A human operator controls front and back motion by shifting his weight forward and rearward. The vehicle provides a method of steering that is very intuitive for the operator and frees his hands. To indicate the direction he wishes to travel, the operator simply swivels his seat in that direction and the vehicle turns as a result of this command.

Figure 1:
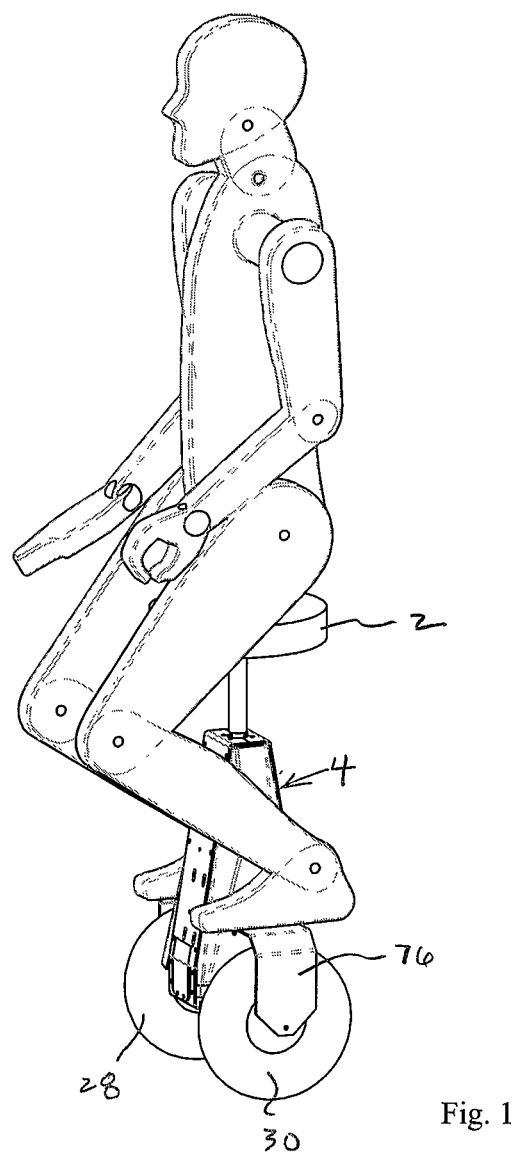
FIG. 1 is a perspective view of the vehicle according to present invention with a human operator.

FIG. 1 shows the preferred embodiment of the invention. The operator or rider sits on a padded seat 2 that is connected with the frame 4 of the vehicle in such a manner that the seat swivels with respect to the frame. The rider supplies a rotational torque with his feet on the frame to cause the seat and much of his body to rotate with respect to the frame of the machine. The offset in the rotational position of the seat causes the vehicle to turn in a direction similar to the direction of the seat.

Figure 2:
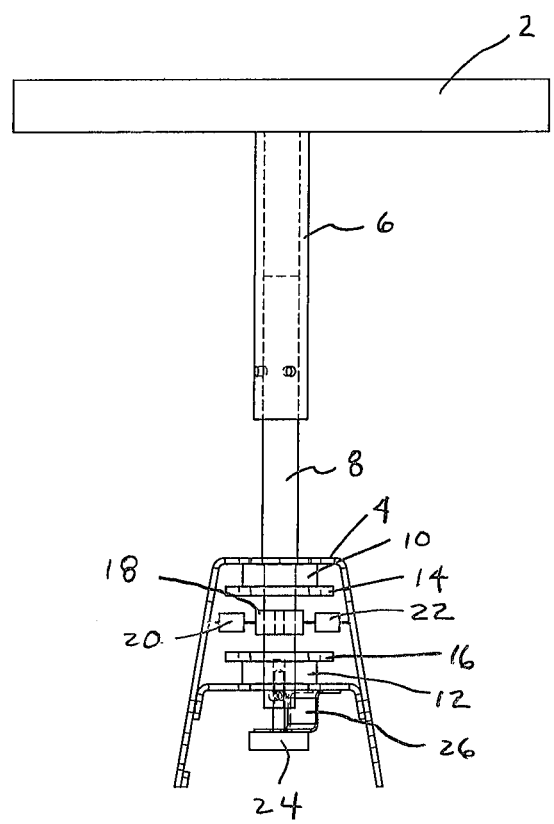
FIG. 2 is a sectional view of the seat swiveling and sensing mechanisms.

FIG. 2 shows the seat swiveling mechanism in detail. The padded seat 2 supports the rider. A tube 6 is attached to the seat 2 and slides over a spindle 8 in a manner that allows for the adjustment of the height of the seat. The spindle rotates in two bearings 10 and 12. The outer races of these bearings are clamped to the frame 4 by plates 14 and 16. A centering arm 18 is connected to the spindle and extends in a direction perpendicular to the spindle. Two springs 20 and 22 attach to the centering arm and to the frame. These springs center the seat in a neutral position when no rider is seated on it. A potentiometer 24 has a shaft which is attached to the end of the spindle. A bracket 26 attaches the body of the potentiometer to the frame. As a result, the rotational position of the seat with respect to the frame is sensed by the potentiometer.

Figure 3:
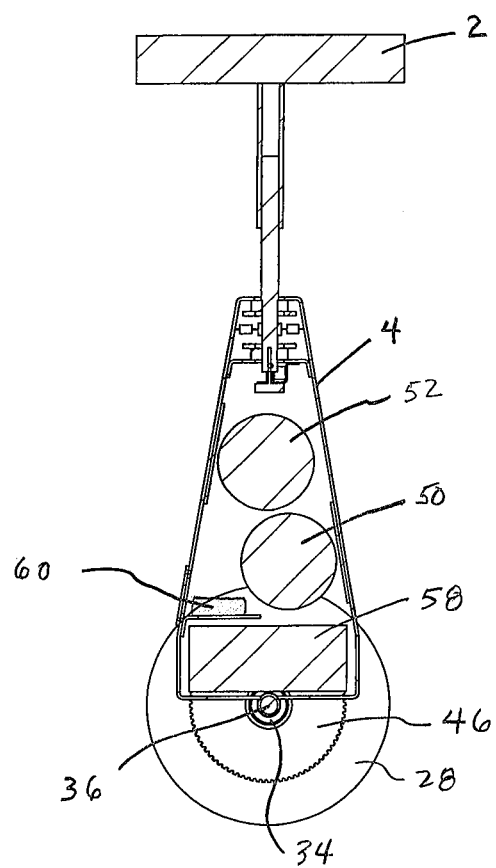
FIG. 3 is a sectional side view of the vehicle according to the invention.
Figure 4:
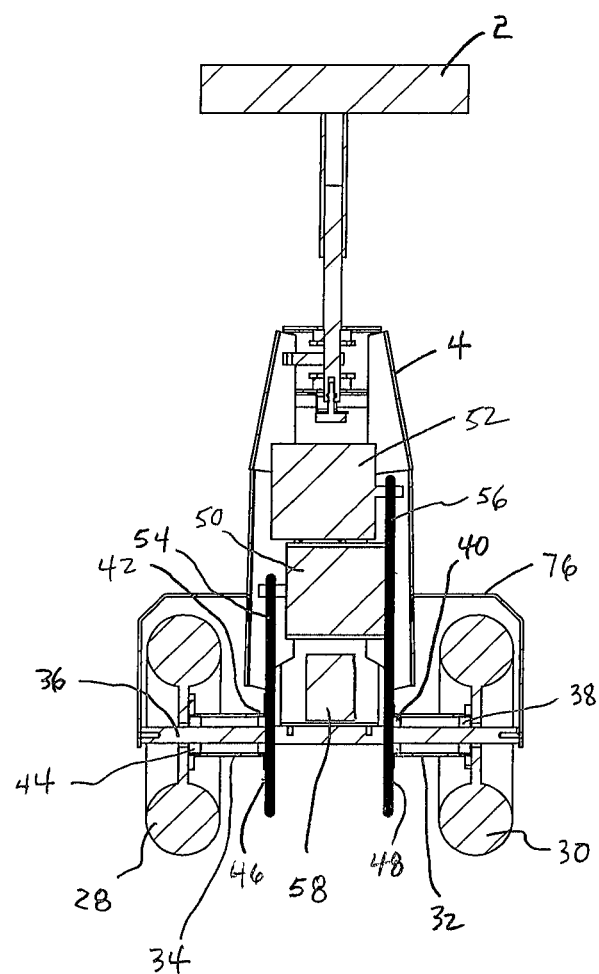
FIG. 4 is a sectional front view of the vehicle according to the invention.

FIGS. 3 and 4 show the drive system of the vehicle. Two wheels 28 and 30 are mounted on hubs 32 and 34. The hubs rotate about a fixed shaft 36 via bearings. More particularly, the hub 32 rotates relative to the shaft via bearings 38 and 40 and the hub 34 rotates about the shaft via bearings 42 and 44. The shaft is rigidly secured to the frame 4 of the vehicle. Also attached to the hubs are sprockets 46 and 48. Electric motors 50 and 52 are also rigidly secured to the frame of the vehicle. Each motor independently drives one of the two wheel assemblies in a forward or reverse direction via roller chains 54 and 56 which engage spindles on the motors and which engage the sprockets 46 and 48, respectively. Thus, for the wheel 28, motor 50 drives the wheel in forward and reverse directions. Similarly, for the wheel 30, motor 52 drives the wheel in forward and reverse directions. A battery 58 provides power to the motors 50 and 52 via a control system 60 as will be developed below.

Figure 5:
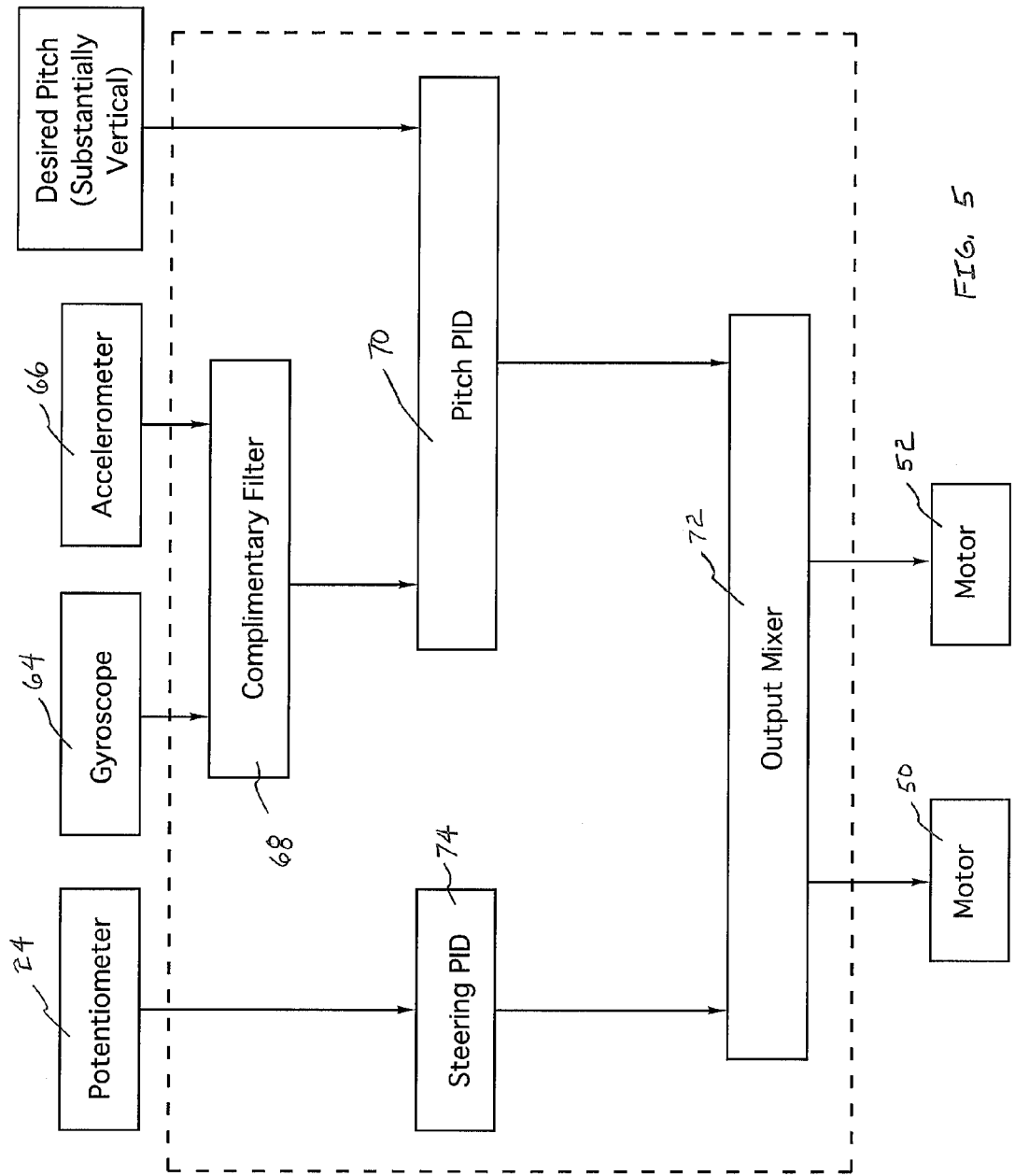
FIG. 5 is a block diagram of the control system for the vehicle of FIG. 1.

The control system 60 controls the operation of the vehicle motors to propel the vehicle in response to movement of the seat by the operator. The control system will be described with reference to FIG. 5. The control system includes a microprocessor 62, a solid state gyroscope 64, and an accelerometer 66. All components are available commercially. The microprocessor receives signals from the gyroscope and the accelerometer to determine the rotational angle of the vehicle in the fore/aft direction. The microprocessor software uses a proportional, integral, derivative (PID) control loop to control outputs to the motors in a manner that keeps the vehicle oriented in a vertical position. Dynamic balancing of this type is described in detail in U.S. Pat. No. 5,971,091 which is incorporated herein by reference and will be familiar to someone skilled in the art.

More particularly, the gyroscope produces an output indicative of the rotation rate of thereof. This output and that from the accelerometer are delivered to a complimentary filter 68 which produces a signal indicative of the estimated pitch of the vehicle. This signal is delivered to a pitch PID 70 in the microprocessor. A desired control pitch signal corresponding to a preferred substantially vertical position is also delivered to the pitch PID. These signals are processed by the pitch PID to produce a pitch output which is delivered to a mixer 72. The mixer produces first control signals which are delivered to the motors 50 and 52 to control the speed and direction of rotation of each motor to maintain the vehicle in an upright position.

In addition, the microprocessor 62 receives a voltage signal from the seat potentiometer 24 that varies substantially linearly with the rotational angle of the seat. The microprocessor includes a steering PID 74 which utilizes software to compare the potentiometer voltage with a known voltage when the seat is in a neutral position. The difference between these voltages is delivered to the mixer 72 which multiplies the difference by a scaling factor. The result is added to the output of one of the motors and subtracted from the other motor. This causes one wheel to rotate faster than the other, which in turn causes the vehicle to turn. In the case where the vehicle is stationary, the difference in output may cause one wheel to turn in the opposite direction of the other wheel and the vehicle will rotate in place about a vertical axis. Similarly, forward and rearward movement of the vehicle in a linear direction is provided in response to forward and rearward tilting movement of the seat, without any lateral swivel.

The vehicle is designed so that in the normal riding position shown in FIG. 1, the operator's feet are positioned on fenders 76 which are connected with the frame 4 and which extend above the wheels. Thus, the operator's feet are directly above the wheels. This helps to align the operator's center of gravity with that of the vehicle to assist in dynamic stability.

The potentiometer could be replaced with an optical encoder or another type electrical transducer which can sense swivel movement of the seat.

The seat can have any suitable shape, such as round, rectangular, or saddle such as a bicycle type seat. If desired, a backrest could also be provided with the seat.

While the preferred forms and embodiments of the invention have been illustrated and described, it will be apparent to those of ordinary skill in the art that various changes and modifications may be made without deviating from the inventive concepts set forth above.

What is claimed is:

1. A motorized vehicle for transporting a human over the ground, comprising:
   (a) a frame;
   (b) a pair of co-axial, laterally opposed wheels rotatably connected with said frame;
   (c) a seat connected with said frame for supporting an operator, said seat being mounted for rotation about a substantially vertical axis;
   (d) a sensing device connected with said frame for sensing the rotational position of said seat and for producing an output signal in accordance with said position; and
   (e) a control system connected with said wheels and with said sensing device for processing said output signal and for independently controlling the rotation speed of said wheels to dynamically balance the vehicle in fore and aft directions and to steer the in a direction corresponding with the direction of rotation of said seat.

2. A motorized vehicle as defined claim 1, and further comprising a pair of motors connected with said frame and with said pair of wheels respectively, said control system varying the direction and speed of rotation of said motors to control the rotation of the wheels, respectively, to steer the vehicle.

3. A motorized vehicle as defined in claim 2, wherein said sensing device comprises a potentiometer which produces said output signal.

4. A motorized vehicle as defined in claim 3, wherein said control system comprises a microprocessor which receives said output signal from said potentiometer and processes said output signal via a steering proportional, integral, derivative control loop to control the direction and speed of rotation of said motors to steer the vehicle.

5. A motorized vehicle as defined in claim 4, wherein said control system further comprises a gyroscope and an accelerometer, each of which produce outputs which are processed by said microprocessor via a pitch proportional, integral, derivative control loop to dynamically balance the vehicle.

6. A motorized vehicle as defined in claim 5, and further comprising a spindle having an upper end connected with said seat and at least one bearing connecting a lower end of said spindle with said frame.

7. A motorized vehicle as defined in claim 6, and further comprising a centering arm connected with said spindle, said centering arm being arranged perpendicular to said spindle.

8. A motorized vehicle as defined in claim 7, and further comprising at least one spring connecting said centering arm with said frame.

9. A motorized vehicle as defined in claim 1, wherein said seat is connected with an upper end of said frame and said wheels are connected with a lower end of said frame.

10. A motorized vehicle as defined in claim 1, and further comprising a pair of fenders connected with opposite sides of said frame and extending over said wheels, said fenders serving as footrests for the operator, thereby minimizing the lateral dimension of the vehicle.

\* \* \* \* \*